L. N. OLSON.
FLUID CLUTCH AND POWER TRANSMISSION MECHANISM.
APPLICATION FILED JUNE 30, 1916.
1,249,660.
Patented Dec. 11, 1917.
2 SHEETS—SHEET 1.
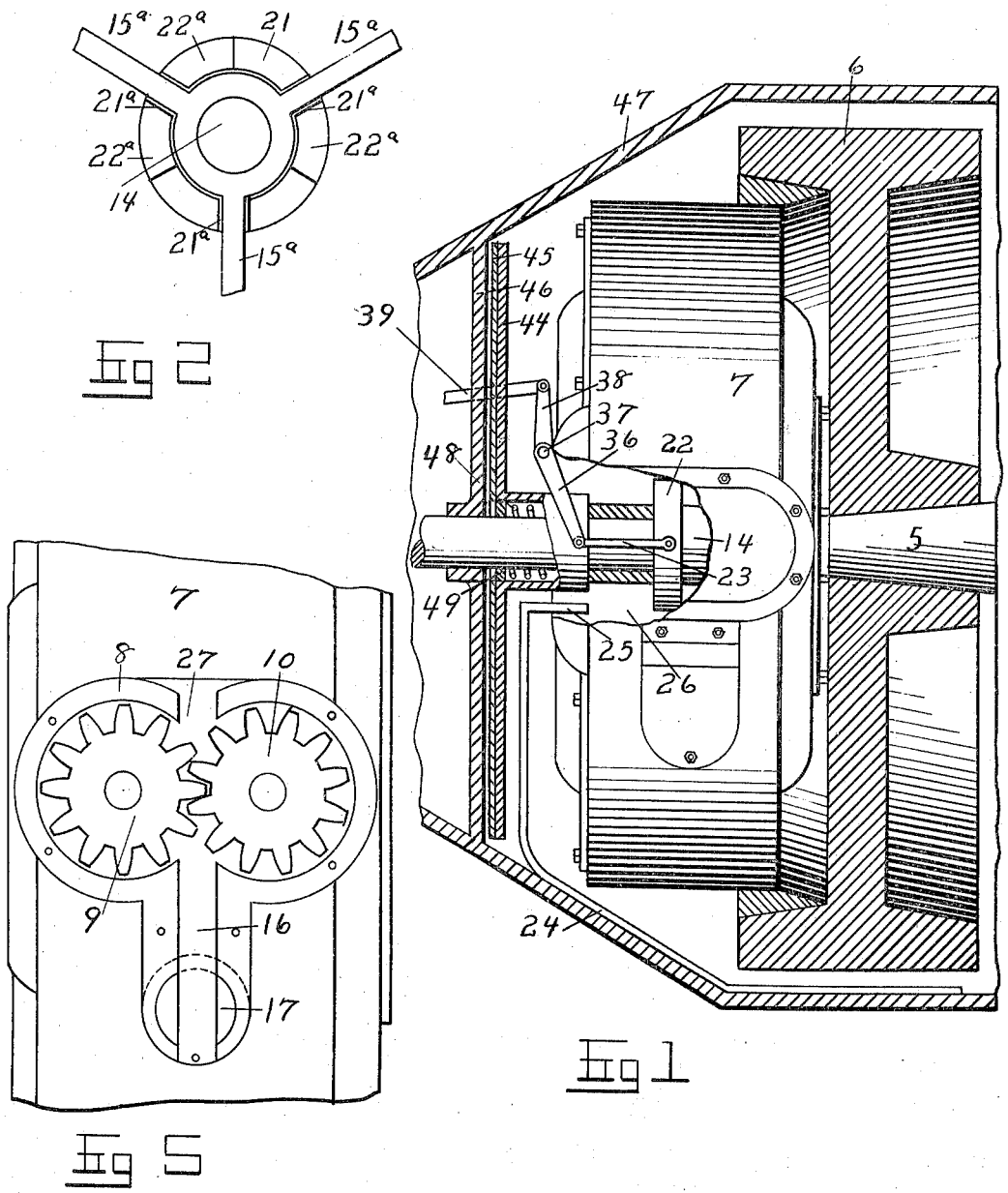
Inventor
L. N. OLSON

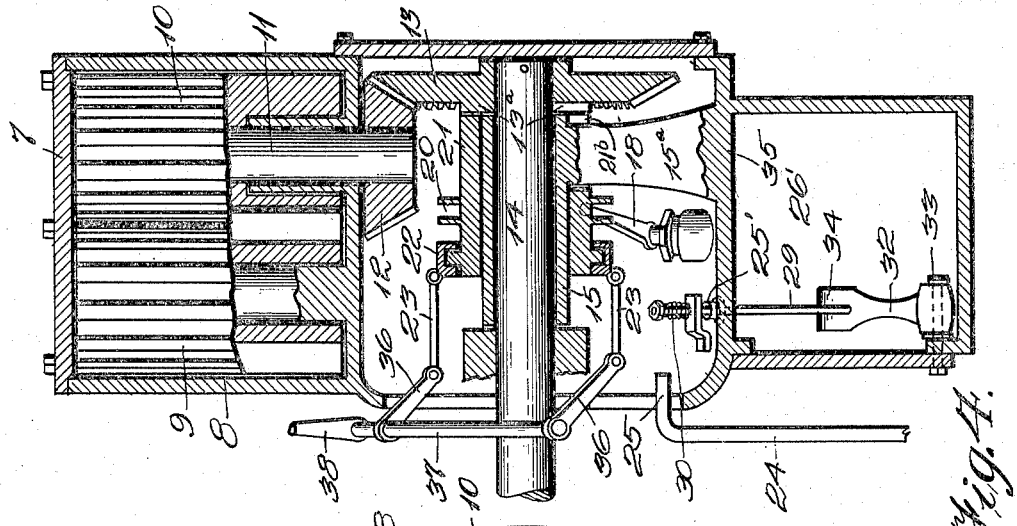
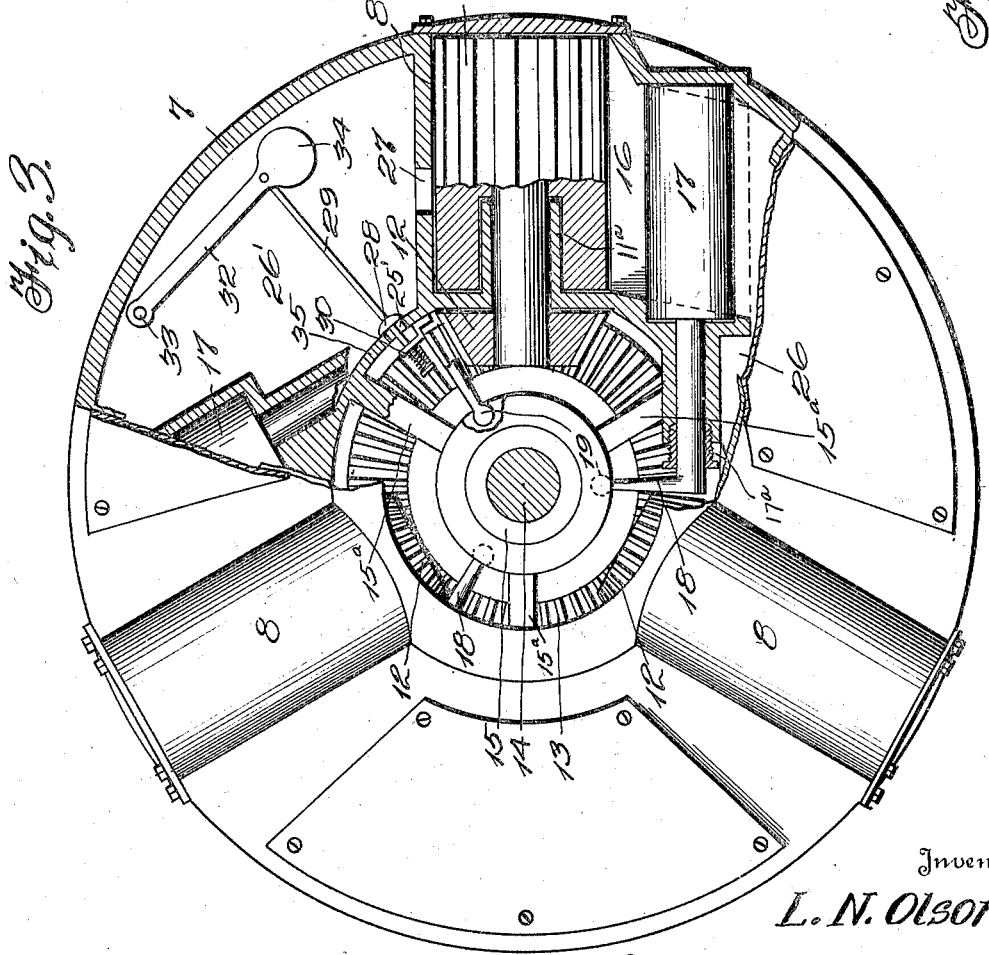

UNITED STATES PATENT OFFICE.

LOUIE N. OLSON, OF COLOME, SOUTH DAKOTA.

FLUID-CLUTCH AND POWER-TRANSMISSION MECHANISM.

1,249,660.   Specification of Letters Patent.   Patented Dec. 11, 1917.

Application filed June 30, 1916. Serial No. 106,357.

*To all whom it may concern:*

Be it known that LOUIE N. OLSON, citizen of the United States of America, residing at Colome, in the county of Tripp and State of South Dakota, has invented certain new and useful Improvements in Fluid-Clutches and Power-Transmission Mechanism, of which the following is a specification.

This invention relates to power transmission mechanism and more particularly a power transmission and change speed gearing for automobiles. The object of the invention is to provide a simple mechanism of the character set forth constructed in such manner that any desired ratio of gearing may be had between the engine and the driving wheels of a motor vehicle and this without the necessity of shifting gears. In a general way, I may say that the invention comprises a casing secured to and bodily rotative with the fly wheel of the engine of the motor driven vehicle. Carried by and bodily movable with the casing are a plurality of pumps which serve to pump oil through a passage-way, there being one of said passage-ways for each of said pumps, together with valves for choking said passage-ways. When the passage-ways are unobstructed, the pump merely operates freely without imparting any movement to the driving wheels of the vehicle but in proportion as the said passages are choked by the valves resistance is applied to the pumps, preventing their movement and this resistance is transmitted to the driving wheels of the vehicle. It will, therefore, be apparent that it is not necessary to shift gears to get change of speed. Upon the contrary, it is only necessary to vary the degree to which the passages are choked by the valves.

My further invention contemplates the provision of a suitable revolving gear as hereinafter set forth.

Further objects and advantages of the invention will be set forth in the detailed description which now follows.

In the accompanying drawing

Figure 1 is a view partly in side elevation and partly in section of my improved mechanism.

Fig. 2 is a detailed end view of a shiftable sleeve hereinafter described.

Fig. 3 is a view partly in front elevation and partly in section of the rotative casing and its contained parts.

Fig. 4 is a vertical sectional view through said casing.

Fig. 5 is a detailed end elevation of one of the pump casings.

Like numerals designate corresponding parts in all of the figures of the drawing.

Referring to the drawing 5 designates the shaft of the engine and 6 the fly-wheel mounted thereon. Secured to the fly-wheel 6 and bodily rotative therewith is a casing 7. Said casing comprises a plurality, in the present case three, pump chambers, said chambers being somewhat oval in cross-section. These pump chambers 8 each contain a pair of geared pistons 9 and 10 which together constitute a pump. One of these pistons is mounted upon a shaft 11 and carries at its inner end a pinion 12. Since there are three of these pumps, it follows that there will be three of the pinions 12. Pinions 12 mesh with a large bevel-gear wheel 13 that is fast upon the end of a driven shaft 14, the shaft 14 being mounted in a bearing 15 of the casing 7. Leading from each of the pump chambers 8 is a discharge passage 16, the passage of the oil through said passage, being controlled by choke-valves 17. It is apparent that with the valves 17 fully opened, no resistance will be exerted upon the pumps but resistance may be exerted thereupon by choking the passages by means of said valves. Each of these valves carries a crank arm 18 upon the outer end of which is a ball-like member 19. These members 19 engage a channel 20 of a sliding sleeve 21. The sleeve 21 is engaged by a collar 22. Said collar is adapted to have longitudinal sliding movement imparted thereto by links 23, hereinafter set forth. Oil supply pipe 24 leads from the crank case of the engine, not shown, and discharges oil through a spout 25 into a chamber 26 formed in the center of the casing 7. Oil is thrown by centrifugal force through ports 25′ into chambers 26′, said chambers serving as supply reservoirs for their respective pumps and being connected to said pumps by ports 27. The ports 25′ are controlled by valves 28 that are mounted upon stems 29. When the parts are in a position of rest these valves are closed by springs 30, so that the oil that has passed into chambers 26 will be held therein to thereby insure the pump always having a full supply of oil. The aforesaid valves are carried by stems 29 which are connected to levers 32, the latter being pivoted at 33 and carrying weights 34. Therefore, when the parts are in motion centrifugal force acts upon these weights to open the valves against the tension of the springs and to permit the passage of oil to the chambers 26.

The bearing 15, see Fig. 3, is supported by radial arms 15ª which extend from bearing 15 to a central annular wall 35 of the casing 7. By referring to Fig. 2, it will be seen that the sleeve 21 is slotted at 21ª to straddle the arms 15ª. Consequently since the casing 7 rotates bodily as a whole, it follows that the sleeve 21 will also rotate though it will be mounted for slidable movement upon the bearing 15. When the sleeve 21 moves to its limit toward the right, teeth 21ᵇ formed upon its end engage with teeth 13ª formed upon the gear-wheel 13 and the parts are then locked in high speed. That is, since the casing 7 rotates bodily with the engine shaft and since sleeve 21 must rotate bodily with the casing, it follows that the gear-wheel 13 must at this time be positively rotative with the engine shaft but upon the initial movement of sleeve 21 toward the left in Fig. 4 the teeth 21ᵇ are disengaged from the teeth 13ª and any desired variation in speed may then be effected by choking the passages from the pumps in the manner hereinafter set forth. These several variations in speed are transmitted to the driven shaft 14 and so it will be seen that means have now been described for positively locking shaft 14 to the engine or for causing said shaft 14 to rotate in one direction and at any desired ratio of speed with relation to the engine shaft without shifting any gears therebetween. These results are effected by the shifting of the sleeve 21 and this is accomplished by movement of the links 23 as hereinbefore set forth. The links 23 are connected to crank arms 36 that are fast upon a transverse shaft 37. Operative movement is imparted to the shaft 37 by an arm 38. The arm 38 is connected to a link 39. Any desired means such as a pedal, (not shown) may be employed for actuating link 39 to shift the sleeve 21. When the pedal is shoved to its limit of movement toward the front or to the right, in Fig. 1, the left hand end of sleeve 21, see Fig. 4, abuts against the hub of a disk 44. The face of this disk is lined with fiber 45 and when the aforesaid action takes place this fiber is pressed against a web 46 of the housing 47. Normally the disk 44 is held out of contact with the housing by a spring 48 that is disposed within its hub and which bears against a collar 49 carried by the shaft 14. The disk 44 is splined upon the shaft 14 and its function is to stop the spinning of the driven parts.

To prevent oil leakage stuffing boxes 17ª are provided about the stems of valves 17. The shafts 11 pass through elongated bearings 11ª and these bearings are in turn overlapped and consequently partially inclosed by the corresponding pump gears 10. This construction prevents air finding its way past said bearings and consequently draining of oil from the chambers 26′ past said bearings is effectually prevented since no appreciable amount of oil will pass out unless a corresponding quantity of air passes in to equalize the pressure inside and outside of the chambers 26′.

It is believed that the advantages of this construction will be obvious. However, it may be briefly pointed out that under this arrangement no gears need be shifted while they are in motion, therefore, breaking of gear teeth will never occur. The ratio of speed between the driving and driven shaft may be varied without shifting gears and to just the extent necessary to accommodate the particular grade being pulled on the heavy road that is being traveled.

While the elements shown and described are well adapted to serve the purpose for which they are intended, it is to be understood that the invention is not limited to the precise construction set forth but that it includes within its purview such changes as fairly come within the spirit of the appended claims.

Having described my invention what I claim is:—

1. The combination with a driving part, a casing secured thereto and bodily rotative therewith, a driven part disposed centrally within said casing, a gear carried by said driven part, a plurality of pinions meshing with said gear, a plurality of rotary pumps disposed within said casing and bodily movable therewith and deriving their pumping motion from said pinions, discharge passages leading from said pump, means for supplying fluid to said pump and means for obstructing the discharge passages of the pump.

2. The combination with an engine flywheel of a casing secured thereto and bodily rotative therewith, a plurality of radially disposed pump chambers formed within said casing, geared pistons comprising the elements of the pump and disposed in the pump chambers, a shaft for one of the geared pistons of each of said pumps, a pinion carried by each of said shafts, a common gear with which all of said pinions mesh, a driven shaft upon which said common gear is secured, means for supplying a fluid to said pumps, discharge passages leading from said pumps, valves for obstructing said discharge passages and manually operable means for shifting all of said valves simultaneously.

3. In a device of the character described, a driving shaft, a driven shaft, a casing bodily rotative with the driving shaft, a gear wheel carried by the driven shaft, a plurality of rotary pumps bodily moving with the casing, a plurality of pinions meshing with said gear wheel, one of said pinions being connected to one of the members of each of the rotary pumps, discharge passages leading from said pumps, valves for choking said discharge passages, a lever for shifting said valves to choke all of said discharge passages simultaneously, a supply chamber for each of the pumps, a centrifugally controlled valve for each of the supply chambers and means for supplying oil.

4. In a device of the character described, a driving shaft, a casing bodily rotative with the driving shaft, a driven shaft, a gear wheel carried by said driven shaft, a plurality of radially disposed rotary pumps bodily movable with the casing, a plurality of pinions meshing with said gear wheel and from which said pumps derive rotary motion, discharge passages leading from said pumps, valves for choking said passages and means for actuating all of said valves simultaneously.

5. In a device of the character described, a driving shaft, a casing bodily rotative with the driving shaft, a driven shaft, a gear wheel carried by said driven shaft, a plurality of radially disposed rotary pumps bodily movable with the casing, a plurality of pinions meshing with said gear wheel and from which said pumps derive rotary motion, discharge passages leading from said pumps, valves for choking said discharge passages and means for actuating all of said valves simultaneously, said means comprising a slidably mounted sleeve, a manually operable member for shifting said sleeve and connections between said sleeve and said valves.

6. In a device of the character described, a driving shaft, a casing bodily rotative with the driving shaft, a driven shaft, a gear wheel carried by said driven shaft, a plurality of radially disposed rotary pumps bodily movable with the casing, a plurality of pinions meshing with said gear wheel and from which said pumps derive rotary motion, discharge passages leading from said pumps, valves for choking said discharge passages and means for actuating all of said valves simultaneously, said means comprising a slidably mounted sleeve, a manually operable member for shifting said sleeve and connections between said sleeve and said valves, said sleeve being mounted to rotate bodily with said casing, and an interengaging member between the sleeve and the gear wheel which serves to lock the gear wheel and the casing into positive engagement with each other.

7. In a device of the character described, a driving shaft, a casing bodily rotative with the driving shaft, a driven shaft, a gear wheel carried by said driven shaft, a plurality of radially disposed rotary pumps bodily movable with the casing, a plurality of pinions meshing with said gear wheel and from which said pumps derive rotary motion, discharge passages leading from said pumps, valves for choking said discharge passages, means for actuating all of said valves simultaneously and means actuated by the longitudinal movement of said sleeve to stop the spinning of the driven parts.

8. In a device of the character described, a driving shaft, a casing rotative with the driving shaft, a driven shaft, a gear wheel carried by said driven shaft, a plurality of radially disposed rotary pumps movable with the casing, a plurality of pinions meshing with said gear wheel and from which said pumps derive rotary motion, discharge passages leading from said pumps, valves for choking said discharge passages, means for actuating all of said valves simultaneously and means actuated by the longitudinal movement of said sleeve to stop the spinning of the driven parts, said means comprising a friction disk and a housing element with which said friction disk engages.

9. In a device of the character described, a driving shaft, a casing bodily rotative therewith, a plurality of radially disposed rotary pumps each comprising intermeshing gears some of which have shafts projecting into the interior of the casing, elongated bearings for said shafts, said shafts snugly fitting said bearings and the corresponding gears of the pumps comprising portions which fit over the outside of the bearings to thereby prevent entrance of air past the bearings.

10. In a device of the character described, comprising a driving shaft, a casing bodily rotative therewith, a plurality of radially disposed rotary pumps each comprising intermeshing gears some of which have shafts projecting into the interior of the casing and bearings for said shafts, said shafts and gears having such relation to the bearings as to prevent the passage of air past said bearings to thereby prevent oil leakage past the shafts and bearings.

In testimony whereof I affix my signature in the presence of two witnesses.

LOUIE N. OLSON.

Witnesses:
H. M. AMDEN,
A. J. ROMBEY.